INVENTOR.
Robert S. Sinn

Aug. 8, 1967  R. S. SINN  3,335,411
STOCK INFORMATION STORAGE AND REQUEST SYSTEM
Original Filed April 13, 1961  6 Sheets-Sheet 3
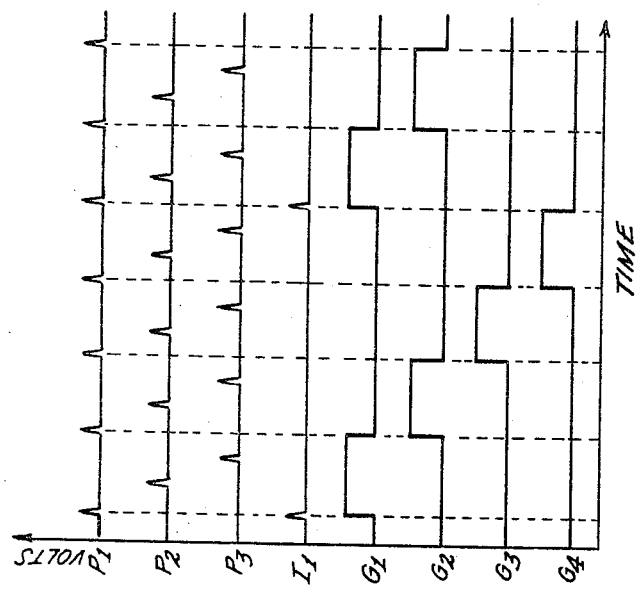
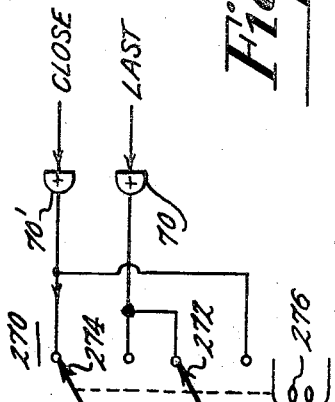
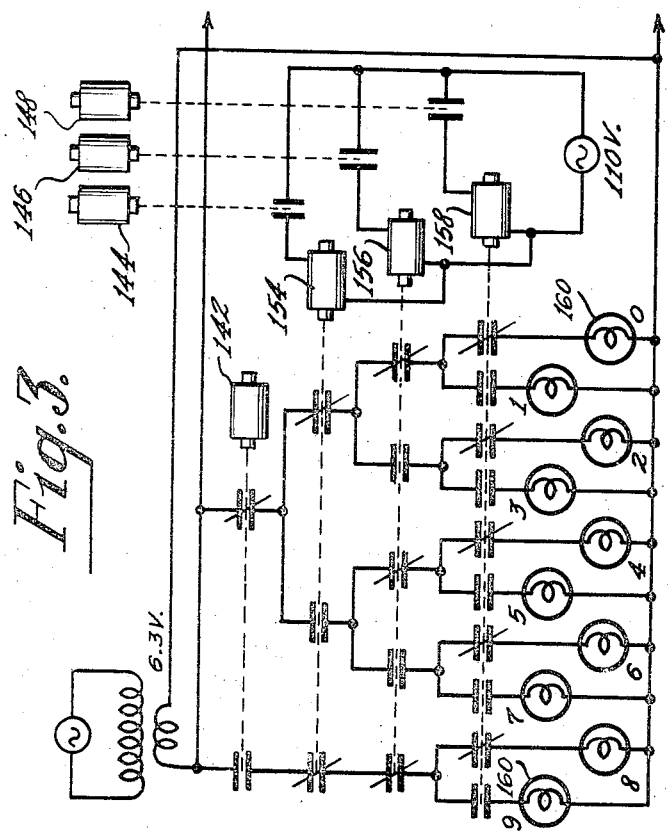
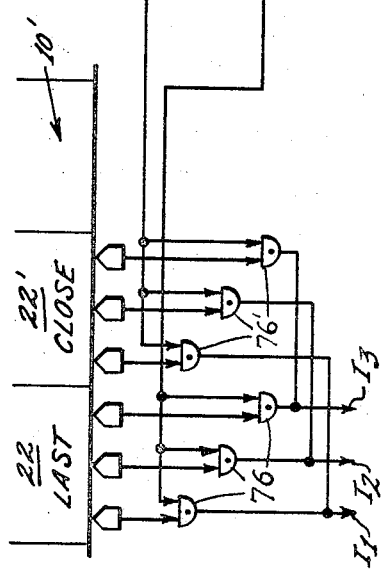
INVENTOR.
Robert S. Sinn
BY
ATTORNEY.

Aug. 8, 1967   R. S. SINN   3,335,411
STOCK INFORMATION STORAGE AND REQUEST SYSTEM
Original Filed April 13, 1961   6 Sheets-Sheet 4

INVENTOR.
Robert S. Sinn
BY
ATTORNEY.

INVENTOR.
Robert S. Sinn
BY
ATTORNEY.

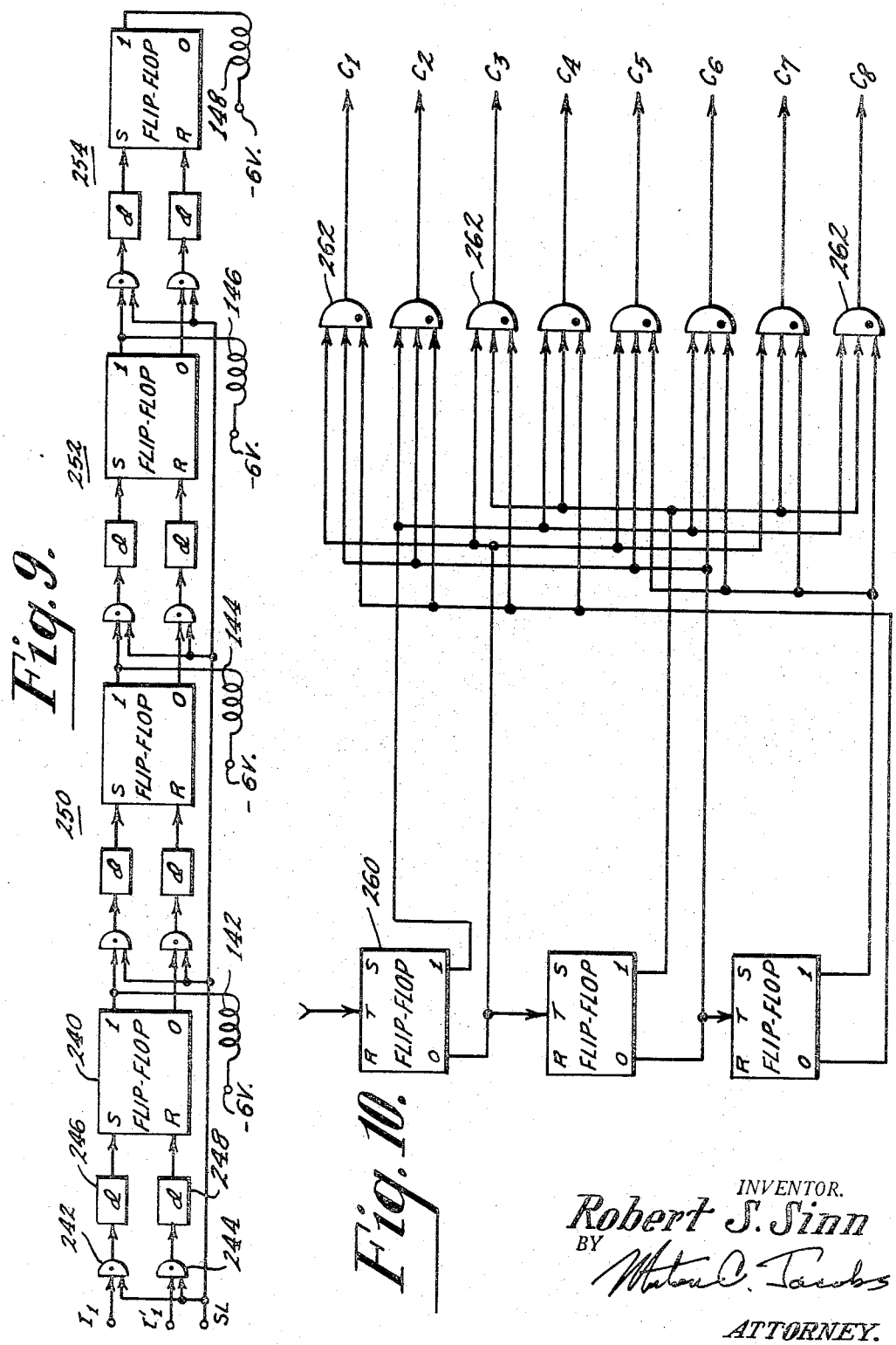

United States Patent Office 3,335,411
Patented Aug. 8, 1967

3,335,411
STOCK INFORMATION STORAGE AND
REQUEST SYSTEM
Robert S. Sinn, Philadelphia, Pa., assignor to Ultronic Systems Corp., Pennsauken, N.J., a corporation of Delaware
Continuation of application Ser. No. 102,882, Apr. 13, 1961. This application Jan. 21, 1966, Ser. No. 526,950
9 Claims. (Cl. 340—172.5)

This application is a continuation of application Ser. No. 102,882, filed Apr. 13, 1961, now abandoned.

This invention relates to data storage systems and particularly to such a system for storing stock prices and related information in a form in which it can be readily selected by an operator in a stock broker's office or the like.

An object of this invention is to provide a new and improved stock quotation system in which a stock broker may have available at his desk current data on any desired stock without recourse to elaborate display boards for the stock quotations and related information.

Anther object is to provide a new and improved digital memory system which is suitable for storing updated stock prices and related data and for furnishing the data at any time to any number of individual stock brokers for rapid read out of the same or different stock quotations or other stock information.

Another object is to provide a new and improved magnetic drum storage and readout system.

In accordance with this invention, a cyclic memory such as a magnetic drum is addressed by a plurality of manually operated consoles. The information stored at each of the addressed locations is directed to the proper console. A selector switching network and logic control permits the consoles to attain access to the memory substantially simultaneously.

In one embodiment of this invention using a magnetic drum memory, the consoles are operable in succession during successive revolutions of said drum to gain access to the stored data for a selected stock and to obtain that data for display. Effectively, the consoles have simultaneous access to the drum memory. Separate logic controls are used for each console so that a varied number of consoles may be used with the memory.

The foregoing and other objects of this invention, the features thereof as well as the invention itself, may be more fully appreciated from the following description when read together in connection with the accompanying drawing, in which:

FIG. 3 is a schematic circiut diagram of control logic for the display of FIG. 2;

FIG. 6 is an idealized graph of timing waveforms from the timing generator of FIG. 4;

FIG. 9 is a schematic block diagram illustrating a shift register used in the system of FIG. 1;

FIG. 10 is a schematic block diagram of a commutator used in the system of FIG. 1; and FIG. 11 is a schematic block diagram of an additional feature of this invention.

In the drawing, corresponding parts are referenced by the same numerals.

Figure 1:
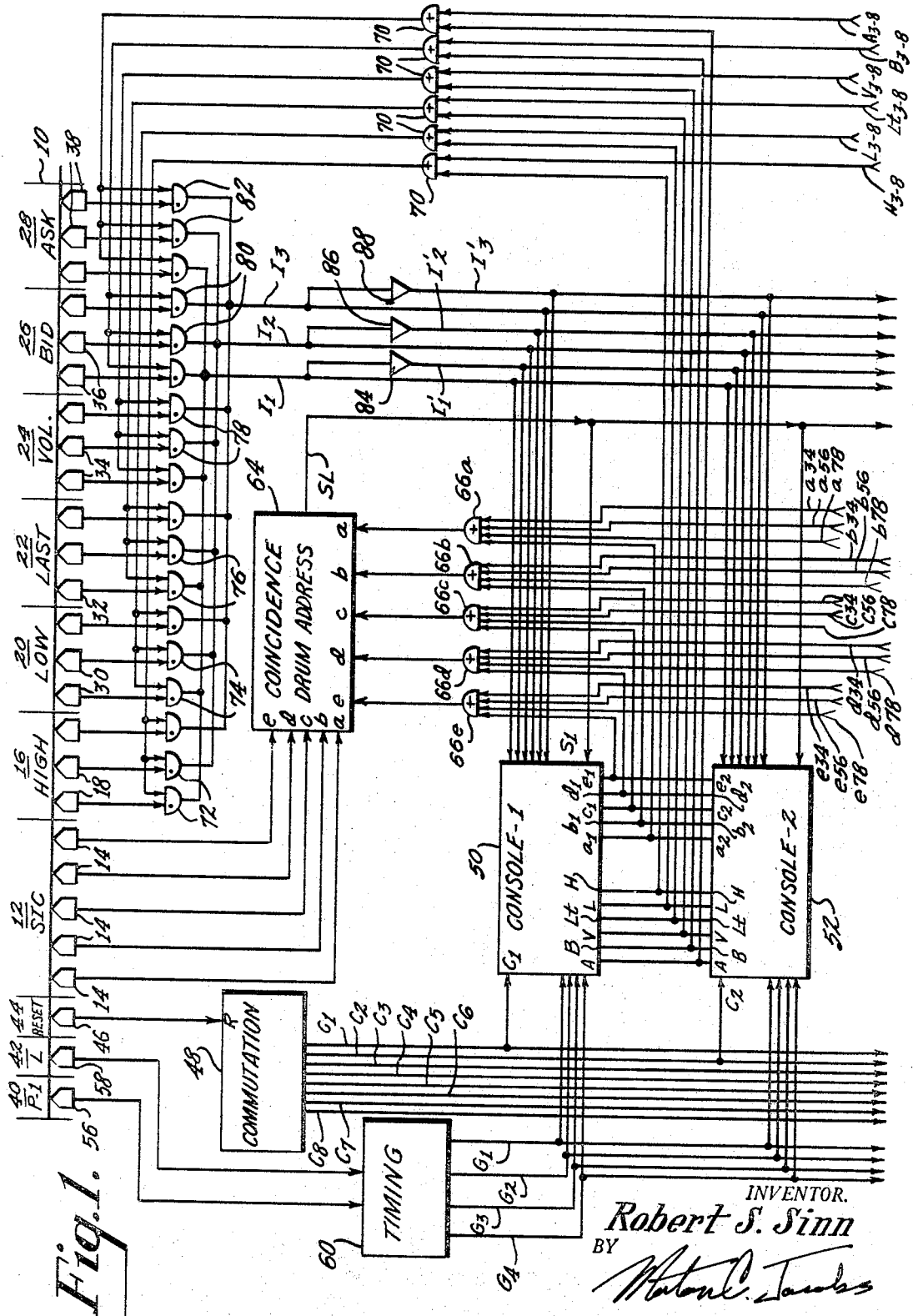
FIG. 1 is a schematic block diagram of a control system embodying this invention for reading out data from a magnetic drum.

In FIG. 1, part of a magnetic drum 10 is illustrated schematically as arranged for the storage of stock quotation data. The drum 10 is divided into a plurality of axial sections, or bins, each associated with a different type of stock quotation data. A first bin 12 is made up of five parallel tracks around the periphery of the drum and is used for storage of the stock identification code (SIC) which is represented by a drum address. Five magnetic recording and reading heads 14 are respectively associated with the five parallel tracks making up the bin 12.

The next bin 16 is used for storing data signals representing the high price quotation for the associated stock and includes three parallel tracks which are respectively read by three read-write heads 18. The other data bins include the low price bin 20, the last price bin 22, the volume of sales (vol.) bin 24, and the bid price bin 26, the ask price bin 28. Each of these bins 20–28 have three tracks which are read by magnetic heads 30–38, respectively. Suitable read amplifiers (not shown) are included with each of the magnetic heads for the drum 10.

Three other tracks 40, 42, and 44 on the drum are used for timing purposes. The track 40 identifies each bit storage position around the drum periphery. This track 40, the timing track, supplies a pulse P–1 at the beginning of each bit storage position. The arrangement of timing pulses for each bit positon is indicated schematically in FIG. 4, which shows the format of the information storage and timing pulses on the drum. The track 42 supplies an index pulse which occurs at the beginning of each group of four bit storage positions; each 4-bit group or cell, corresponds to a complete drum address, and the information associated with a drum address is also grouped as a 4-bit cell. The track 44 provides a timing signal once per revolution of the drum; this signal is used as a reset signal and for commutation purposes. The head 46 for track 44 is connected to the input of a commutator 48 which supplies timing pulses successively on lines C–1 to C–8. These commutator lines C–1 to C–8 are respectively connected to eight manually operated consoles 50, 52 (the other six of which are not shown); these consoles are respectively numbered 1–8 corresponding to the commutation lines associated therewith.

The heads 56 and 58 respectively associated with the timing tracks 40 and 42 have their outputs connected to a timer 60; the timer 60 supplies gate-enabling signals on the output lines G–1 to G–4 during the timing periods corresponding to the four successive bit positions of a memory address. The lines G–1 to G–4 are connected to the inputs of each of the eight consoles 50, 52.

The outputs of the SIC heads 14 are lines $a$, $b$, $c$, $d$, and $e$ connected to one set of inputs of coincidence logic 64 for locating a selected drum address.

Console-1 supplies signals to output terminals $a1$–$e1$ from which lines are respectively connected to five buffers 66$a$–66$e$. These buffers are respectively connected to corresponding $a$–$e$ inputs of the drum-address coincidence 64. The console-2 similarly supplies signals to output terminals $a2$–$e2$ which are connected together with the lines from the $a1$–$e1$ terminals via the buffers 66$a$–66$e$ to the similar inputs of the drum-address coincidence 64. The connections of the lines from the terminals $a1$–$e1$ and $a2$–$e2$ are suitable buffers which are omitted from the drawing for simplicity of illustration. Such buffers are included throughout the logic of this system for ensuring proper isolation; and though omitted from the drawing for simplicity sake, such buffers should be provided wherever a plurality of lines are connected together in an "or" logic mode.

The corresponding $a$–$e$ outputs from consoles-3, -4, -5, -6, -7 and -8 (not shown) are supplied on lines to the drum address 64 in the same way as those for consoles-1 and -2; this is represented in FIG. 1 by the lines $a3$, 4 which come from the output terminals of the third and fourth consoles lines $a5$, 6 from the fifth and sixth consoles, and lines $a7$, 8 from the seventh and eighth consoles in the manner described for the consoles-1 and -2. In a similar way, the $b$–$e$ lines represent the connections from the other consoles-3 to -8, and these lines are connected to the drum-address coincidence 64. The output of coincidence 64 is a shift-pulse line SL that is connected as an input to each of the consoles.

Also coming from console-1 are output selector lines H, L, L$t$, V, B, and A, each corresponding to and associated with one of the information bins on the drum, that is, High, Low, Last, Volume, Bid, and Ask, respectively. These lines are connected to buffers 70 which have outputs respectively connected to different sets of read-out gates 72, 74, 76, 78, 80, and 82, respectively associated with the corresponding bins 16, 20, 22, 24, 26, and 28 on the drums. That is, the H-output from console-1 is connected via a buffer 70 as an input to the three gates 72, the other inputs to which are connections from the three read heads and amplifiers 18 for the tracks in the High bin 16. The L-output from console-1 is connected via another buffer 70 to the three gates 74 receiving inputs from the heads 30 of Low bin 20.

Similar selector lines H, L, L$t$, V, B, and A from console-2 are connected together with the corresponding output lines from console-1 to one input of the buffer 70. Similar selector lines from the consoles 3–8 (not shown) are also connected to corresponding ones of the buffers 70, and these output lines are referenced in FIG. 1 as H3–8, L3–8, etc.

The first gate of each of the groups of read-out gates 72–82 are connected together (via a buffer not shown) to a first information line I–1 and, via an inverter 84, to information line I–1'. Similarly, the second gates of each group are connected to information line I–2 and, via an inverter 86, to information line I–2'. The third gates are connected to line I–3 and via an inverter 88 to line I–3'. The lines I–1, I–1', I–2, I–2', I–3, and I–3' are all connected as inputs to console-1 and console-2, as well as to consoles 3–8.

Figure 2:
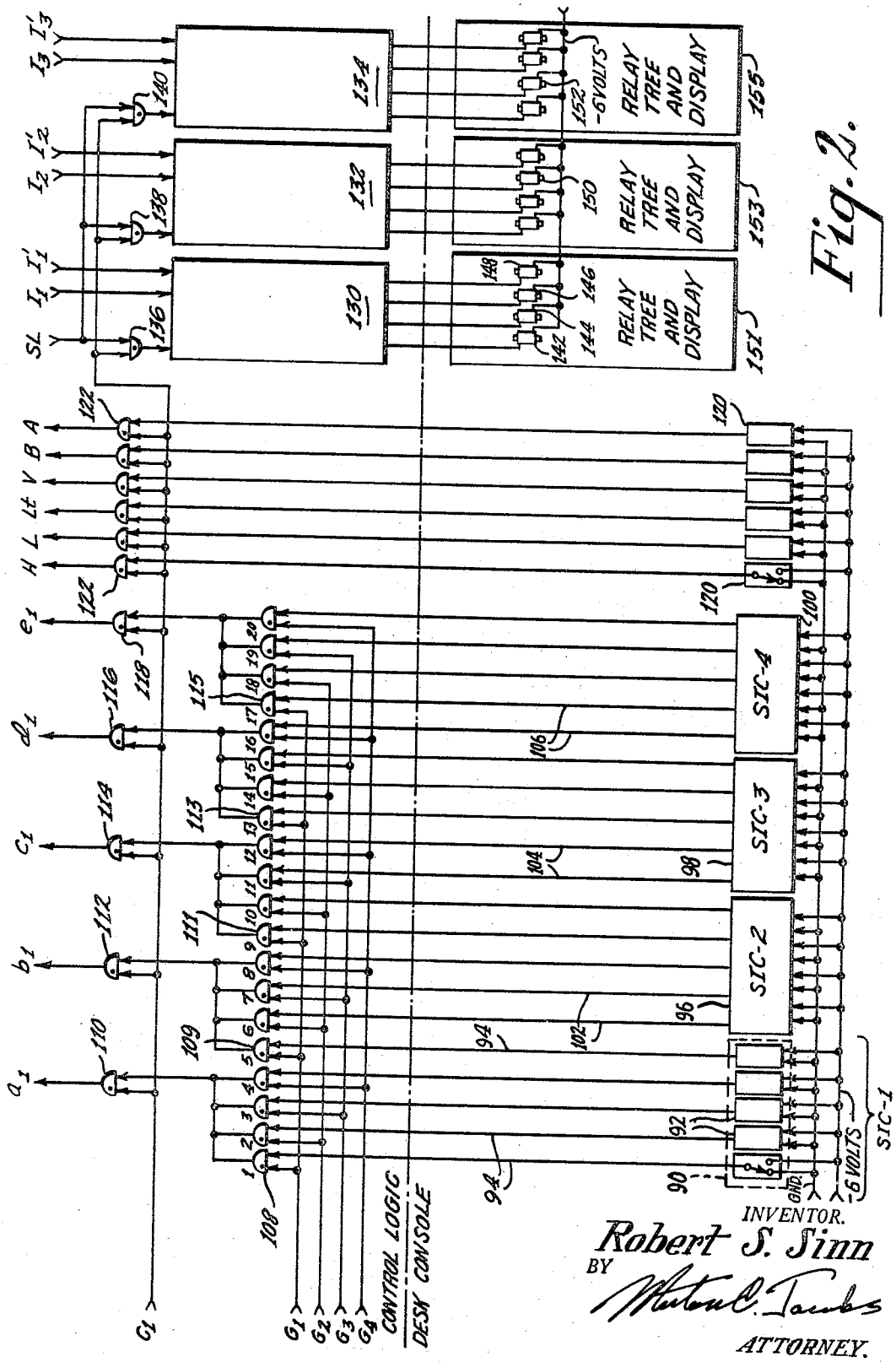
FIG. 2 is a schematic block diagram of a control and display system operable together with the system of FIG. 1 arranged for manual selection of the data to be read out and displayed.

In FIG. 2, the construction of console-1 is illustrated; each of the other consoles has the same construction except for the commutator line connected to it. The console includes electrical elements associated with the apparatus which are mounted in a desk console and manually operated for selection and display of information; in addition, certain of the logic networks are individually associated with console-1 and function to control the selection and read-out operations. The location of this individual control logic separate from the switches and relays associated with the desk console itself is indicated by a broken line in FIG. 2.

The selection and representation of each stock is by means of a code using four alphabetic characters SIC–1 to –4. The selection of the first stock identifier SIC–1 in the desk console is by means of a group 90 of five switches 92, each of which may be represented as a single-pole double-throw switch. The switch 92 supplies either of two potential levels to selector line 94 depending on its condition of operation, one of the levels being a gate-enabling potential and the other, a gate-disabling potential. These levels are represented in FIG. 2 by $-6$ volts and ground potential respectively. Upon operation of the switch group 90, the group of five selector lines 94 carries binary signals combinatorily representative of the first stock identifier character SIC–1. The operation of the switch group 90 may be by any appropriate means, such as by a keyboard to establish a digital signal combination in a well-known manner. The keyboard operation is such as to maintain the switches in their condition of operation such as by a latching detent arrangement during the time access to the drum is desired. The second, third, and fourth switch groups 96, 98, and 100, respectively, for SIC–2, SIC–3, and SIC–4 are similarly constructed and operated in association with selector lines 102, 104, and 106.

The first four selector lines 94 are individually connected to a group of four gates 108 which respectively receive as their other inputs the timing signals G–1, G–2, G–3, G–4. The outputs of these gates 108 are connected together via a buffer (not shown) to the input of another gate 110, the other input of which receives the commutation signal C–1. The output terminal of gate 110 is the terminal $a1$. As is explained below in detail, the timing signals G–1 to G–4 occur during successive time intervals corresponding to successive bit storage positions around the drum. The signals at the output $a1$ of the gate 110 are successively the output signals gated by G–1 to G–4 through the four gates making up the group 108.

In a similar fashion, the fifth selector line 94 and the selector lines 102, 104, and 106 are connected to gates 5–20 in groups 109, 111, 113, and 115 of four gates each. The gates 5, 9, 13, and 17 receive gating signal G–1, gates 6, 10, 14, and 18 receive gating signal G–2 and so on. Gates 5–8 make up group 109, and its output is connected to the input of gate 112; gates 9–12 in group 111 are connected to the input of gate 114; gates 13–16 in group 113 are connected to the input of gate 116; and gates 17–20 in group 115 are connected to the input of gate 118. Each of these latter gates 112–118 is also gated by the first commutation signal C–1 associated with console-1. The output terminals of gates 112, 114, 116, and 118 are the address lines $b1$, $c1$, $d1$, and $e1$ which are connected to the drum-address coincidence 64 (FIG. 1).

A group of six manually operated switches 120 (each of which may be individually operated and latched by a depressible key) on the desk console are individually connected to gates 122 which are also gated by commutation signal C–1, and the outputs of these gates 122 are respectively connected to the selector lines H, L, L$t$, V, B, and A.

The control logic associated with each console also includes three shift registers 130, 132, and 134, each of which has four stages and each receives shift pulses via the shift line SL and one of the gates 136, 138, and 140, respectively, which gates are timed by the commutation signal C–1. The first information line I–1 and its inverse I–1' are connected to the first shift register 130; I–2 and I–2' are connected to shift register 132; and I–3 and I–3' are connected to shift register 134.

Four output lines from the shift register 130 are respectively associated with the four stages of that register 130 and are individually connected to the coils of four relays 142, 144, 146, 148. The four output lines of shift register 132 are individually connected to four relays 150, and the four outputs of shift register 134 are individually connected to four relays 152. These relays 142–152 are direct-current relays operable by a 6-volt line directly under the control of the stages of the shift registers 130–134. Necessarily, these relays are small to be so operated and only have a single level operating a single-pole double-throw switch. Three relay trees and displays 151, 153, and 155 are individually associated wtih the relays of the three shift registers 130, 132, and 134.

As shown in FIG. 3, the four-bit binary coded signals established in the relays 142, 144, 146, and 148 are converted to a decimal form by the relay tree 151. The relay 142 is connected in the relay tree operating the first switch level of that tree. The normally-closed contact path of the switch is represented by two parallel bars crossed by a slant bar; and the normally open path is represented by two bars without the slant bar. The relay 144 operates through its switch and a 110-volt line, a multi-level alternating-current relay 154 which provides two levels for the second level of the relay tree. Similarly, the relay 146 operates another relay 156 which in turn provides the three levels required in the third level of the relay tree, and the relay 148 operates another relay 158, which in turn operates the fourth level of the relay tree having five poles. The relay tree is connected to provide ten output lines, one of which is energized depending upon the combinatorial state of energization of the relays 142, 154, 156, and 158. These ten output lines of the relay tree are connected via the filaments of ten lamps 160 to a 6-volt output of a filament transformer coupled to the 110-volt alternating power source. Thereby depending upon the states of the stages of the shift register 130, the relays 142, 154, 156, and 158 are in a combination of states which determine which one of the lamps 160 representing the decimal numerals 0–9 is lit. The lamps 160 may be individually associated with ten screens, each displaying one of the ten numeric characters by light projection or by any other suitable means. The other relay trees 153 and 155 are constructed and operate in a similar fashion.

Figures 4, 5:
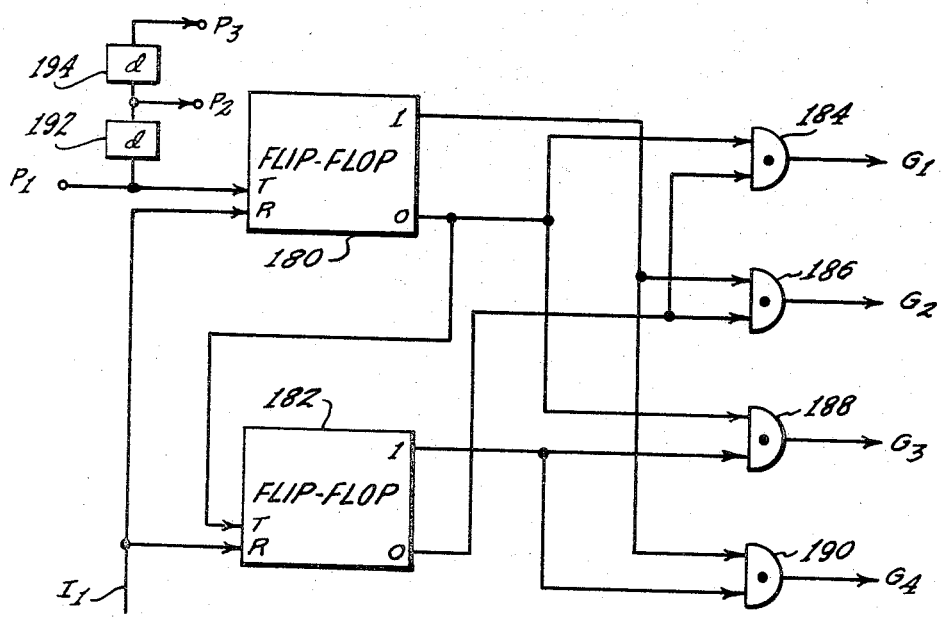
FIG. 4 is a schematic diagram illustrating the arrangement of data on the magnetic drum used with the system of FIGS. 1 and 2.
FIG. 5 is a schematic block diagram of a generator of timing signals for use in the system of FIG. 1.

The arrangement of the stored signals and of the timing signals on the drum is indicated by the format diagram of FIG. 4. The direction of movement of the drum is indicated by the arrow 170. An index signal used for reset is stored in the reset track 44; this is a single pulse representing the start of each drum revolution. This reset pulse is used to operate the commutator 48. Index pulses stored in an index track 42 mark successive groups of 4-bit storage positions around the periphery of the drum. Each group of four such bit positions is called a cell, and the index pulses in track 42 are located at the beginning of successive cells and are used to mark the beginning of these cells. Timing pulses P–1 are stored in track 40 and mark the beginning of successive bit storage positions. The information cells in the bins 16, 20, 22, 24, 26, and 28 are offset rotationally from the stock identification code or address for these information groups as indicated in FIG. 4. That is, the address identification for a stock identification code is made up of the twenty bits established by the switch groups 90, 96, 98, and 100 in the desk console, which twenty bits are stored in a cell of five tracks. The corresponding price information for that address is stored in the next cell position in bins of three tracks each. With this arrangement, after a selected address is located on the drum, the corresponding price information is immediately available for read out.

Inasmuch as the bit positions in a given row of the stock identification code section occur simultaneously in tracks *a* through *e*, they may be considered to be in parallel. The bit positions in successive rows of a given track may be considered to be in series. Hence the stock identification code section may be termed a series-parallel format. Similarly, each category of information is stored in a series-parallel format, and the corresponding bit positions in the category sections for each stock occur simultaneously and at least one bit position after the last bit position in the stock identification section for the respective stock. As already explained in connection with FIG. 2, the twenty stock identification switches in a request unit are enabled five at a time in four successive bit intervals, so that the coded multi-character stock identification request signal is produced in series-parallel conforming to the series-parallel format of the drum.

The timer 60 is shown schematically in the block diagram of FIG. 5. This timer includes two flip-flops 180 and 182 connected as a two stage binary counter with the 0-output of the flip-flop 180 connected to the trigger input of the flip-flop 182. The outputs of the flip-flops 180 and 182 are connected combinatorily to four gates 184, 186, 188, and 190. Both flip-flops are reset by index pulses I–1 developed from the drum index track 42. The trigger input to the first flip-flop 180 receives the timing pulses P–1 from the timing track 40. In operation, at the start of each cell, the index pulse I–1 resets the flip-flops 180 and 182 and the timing pulse P–1 occurring at the same time should produce a count of 4 and, therefore, also tends to reset those flip-flops. The development of the timing signals G–1 to G–4 from the signals I–1 and P–1 is shown in FIG. 6. The output of the gate 184 is a gate-enabling signal (say, a low, or negative-going voltage level) during the interval when the flip-flops 180 and 182 are both in the reset state which is the time from the first timing pulse P–1 to the second such pulse. The other gates 186, 188, 190 produce high, gate-disabling signals at that time. At the second timing pulse P–1, the first flip-flops 180 is switched to the 1-state so that the output of gate 186 is low, and the others are high. At the third pulse P–1, the output of gate 188 is low; and at the fourth such pulse P–1, the output of gate 190 is low and continues low until the next timing pulse P–1 which is at the start of the next cell.

Within each bit position, two additional timing signals P–2 and P–3 are generated from P–1 by sending P–1 through two successive delay lines 192 and 194. The delays of the latter are each one-third of the time interval between P–1 pulses, so that the time interval for each bit position is divided into three equal parts by the pulses P–1, P–2, and P–3.

In operation, a particular stock is selected by manual actuation of the four SIC switch groups 90, 96, 98, and 100. This selection establishes a unique combination of signals on the twenty selector lines 94, 102, 104, and 106, which signals represent the drum address. These signals are gated through the gates 108, 109, 111, 113, and 115 and the gates 110, 112, 114, 116, and 118 during the associated commutation signal C–1, which is available during the associated drum revolution. During an entire revolution, C–1 permits successive repetitions of G–1 to G–4 to gate the twenty drum address signals to the output terminals *a1–e1* and thence to the inputs of the drum-address coincidence 64 (FIG. 1). At the same time, in synchronism, the successive SIC lines from the drum are transmitted in groups of five signals to the other inputs of the coincidence 64.

The console operator also selects a particular bin of information to be read out by operating one of the selector switches 120. For example, if the switch 120 for the "High" bin 16 is operated, the H-line transmits an enabling signal during C–1 to the gates 72 (FIG. 1) to pass successive information lines of signals from the tracks of bin 16 to the information lines I–1, I–2, and I–3.

When the drum address signals from the SIC bin 12 coincide with the selected signals from the console, the coincidence 64 supplies a series of four shift signals on the shift line SL. These SL signals (under the control of the C–1 signal at gates 136, 138, 140) establish the corresponding "High" information signals in the four stages of the shift registers 130, 132, and 134. Thereby, the twelve relays 142, 144, 146, 148, 150, and 152 are energized combinatorily in accordance with the twelve bits of information read out of the proper cell of the "High" bin 16. The states of the relays are, in turn, decoded by the associated relay tree (FIG. 3) to light the corresponding one of the lamps 160 and display the requested information in the form of three decimal numbers.

When console-1 is operable to call for information under the control of C–1, the requests of other consoles do not interfere with that request of console-1. The commutation of C–1 to C–8 ensures the independence of access of each console and yet permits the use in common of a single coincidence 64 and associated logic and signal lines of FIG. 1 for all of the consoles. With available drum speeds, all of the eight consoles would have access to the drum in a fraction of a second, and two or three times that number of consoles would gain access to the drum within a second. Thus, in effect, the consoles have simultaneous access to the drum under the mode of operation described above.

The operator may successively actuate the switches 120 to display the entire gamut or any part of the stored information. Within the observation time of the operator, there would be no delay in the display of information. If the operator leaves the SIC switches actuated together with one of the selector switches 120, the information in the shift register 130, 132, and 134 is replaced by the same information during the associated drum revolution as long as the stored information remains unchanged. However, any changes in the stored drum information will be immediately displayed when the associated commutation cycle completes the connection to the drum.

Although the information in the shift registers 130, 132, and 134 of console-1 changes during the transitions caused by shifting between stages and by the replacement of the shift register signals during each C-1 cycle, these transitional conditions do not affect the display lamps 160; the lamp conditions change only when the information to be displayed changes. This is a consequence of the relative time constants of the different elements of the system. The relays 142 to 152 have a time response of the order of milliseconds, say about 20 milliseconds, for switching from one operating state to the other; while the signal transients in the shift registers are of the order of microseconds, say about 10 microseconds. The time involved in shifting out the information stored in the registers 130, 132, and 134 and refilling them with the same or different information, in the cell time from G-1 to G-4, is the shift register loading time, and it is about 40 microseconds. The relay response time, that is, the time needed to actuate, or to release, the relays is, therefore, very much greater than the shift-register loading time. This relationship is desirable in order to assure that the relays, such as those of console-1, are not affected by the reloading of the shift registers with the same information during repeated C-1 commutation cycles. Even though the energization of the relays is momentarily varied during each C-1 commutation cycle, the variation occurs for so short a time that the relays remain unaffected. With a drum speed of 30 revolutions per second (33.3 milliseconds per revolution) the relays are actuated within a single revolution of the drum after a change in the shift register information. Therefore, even if only a single console were used, or the same console of a plurality were given access to the drum upon each drum revolution, the time of information storage in the shift register during a drum revolution would be sufficient to actuate the relays. The system of this invention is effective even with drum speeds that are much greater such that the relays would not be actuated within the effective storage time of the shift registers, that is, the time during which they remain unchanged. For example, with a drum speed of about 10 milliseconds per revolution, and with a drum access each revolution to reload the shift registers, it would require about two drum revolutions to actuate the relays. Even with a momentary discontinuity in the charging of the relay coil during reloading of the shift register, the relay is properly actuated because its energization is cumulative over successive drum cycles due to the reactive charging circuit of the coil. Consequently, the lamps remain in a static display without flickering or other disturbance with these various arrangements.

With the system of this invention, a large amount of stock information is available to the operator at any time and in any instant. Magnetic drums available in the present state of the art would permit the economic storage of a wide gamut of stack information of some 3,000 stocks which is the total amount presently in effect in both the major exchanges and in over-the-counter transactions. With this system, all of this large body of information or any part of it is available to the operators of a plurality of consoles. All of the consoles may be reading out of the drum on successive commutation cycles from different or the same drum addresses; the operation is without interference one with the others and the display at each console is complete and reliable and essentially immediately obtained upon request.

Suitable systems are well-known in the data processing art for writing the information on the drum and for changing the stored information. These systems make use of read-write magnetic recording heads and switching circuits that disconnect the reading and writing circuits, respectively, while the writing and reading operations are being performed.

Figure 7:
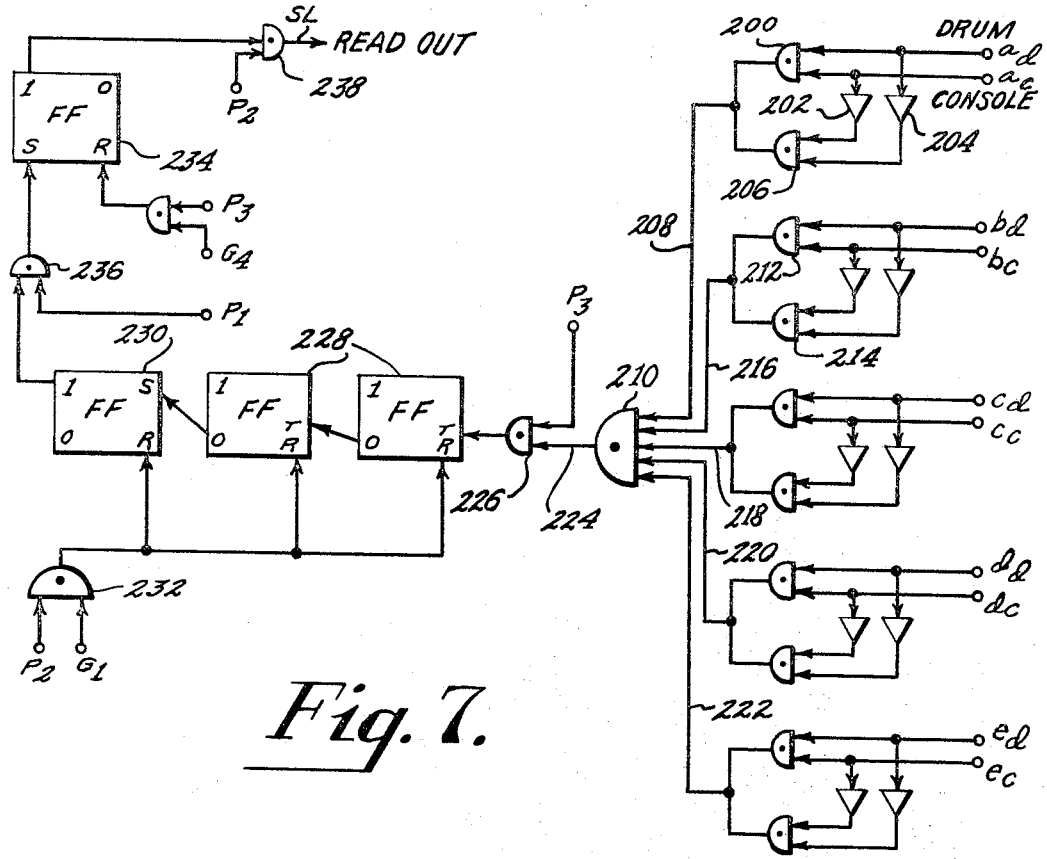
FIG. 7 is a schematic block diagram of the drum-address coincidence logic used in the diagram of FIG. 1.

In FIG. 7 a logical block diagram of the drum-address coincidence 64 (FIG. 1) is shown. The $a$-line from the drum and the $a$-line from the console are both connected to a gate 200. These lines are also connected via inverters 202 and 204 to a second gate 206. The gate 200 may be considered as supplying a gate enabling output signal only when both $a$-lines are in the 1-state, and the gate 206 as supplying a gate-enabling output signal when both $a$-lines are in the 0-state (as a consequence of the inverters 202 and 204). The outputs of the gates 200 and 206 are connected together via a buffer (not shown) and line 208 as an input to another gate 210. Thus, an enabling signal is supplied to the gate 210 from one of the gates 200 or 206 only when both $a$-lines are in the same state, that is, when coincidence of the $a$-lines exists. In a similar fashion, gates 212 and 214 are connected to provide an enabling signal on the line 216 at their outputs when both $b$-lines are in the same electrical state. Similarly, an enabling signal on line 218 represents both $c$-lines in the same state, an enabling signal on line 220 represents both $d$-lines are in the same state, and an enabling signal on line 222 when both $e$-lines are in the same state. Accordingly, an enabling signal on the output line 224 of gate 210 which receives the signals on lines 208, 216, 218, 220, and 222 represents coincidence of the drum-address signals from the drum and the selected SIC signals from a console.

Figure 8:
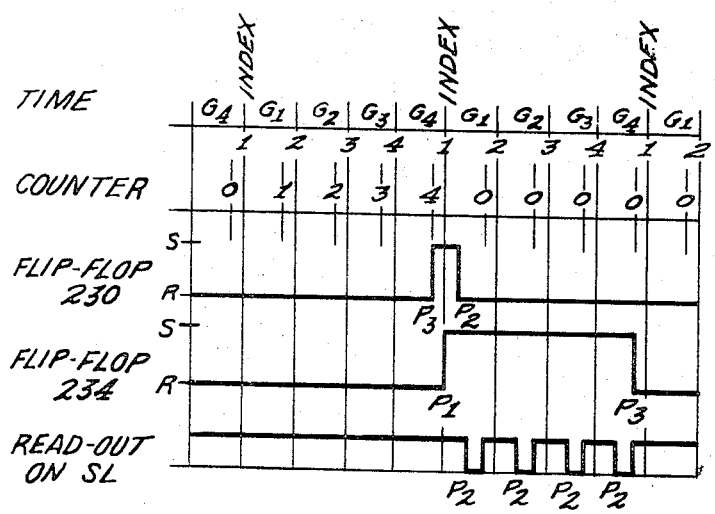
FIG. 8 is an idealized graph of waveforms occurring in the logic of FIG. 6.

The enabling signal on line 24 is gated by a timing signal P-3 in gate 226, the output of which is applied to the trigger input of a two-stage binary counter 228. When the counter 228 counts to a count of 4, the second stage thereof resets to 0, which condition sets a flip-flop 230 to store temporarily the count of 4. The counter 228 and flip-flop 230 are reset by a P-2 signal during the time of G-1 via a gate 232. The state of flip-flop 230 is gated to a second flip-flop 234 via a gate 236 in response to the next P-1 pulse. The flip-flop 234 is reset by P-3 pulses during the time of G-4. The output of the flip-flop 234 is gated through gate 238 under the control of P-2 signals to provide a series of read out or SL pulses. The time relation of the operations of the coincidence logic is presented in FIG. 8.

In operation, the first line of the stock identification code in a drum cell is compared with the signals established by G-1 applied to the first ones of the gates 108, 109, 111, 113, and 115; that is to gates numbered 1, 5, 9, 13, and 17. Assuming coincidence occurs and a pulse is established at the line 224, this signal is gated through the gate 226 by P-3 of that G-1 to register a count of 1 in the counter 228. In a similar manner, during the next time interval of G-2, gates 2, 6, 10, 14, and 18 supply signals to the $a$–$e$ lines for comparison with the second SIC line in the drum cell. And similarly, during G-3, and G-4, the third and fourth SIC lines in the drum cell are compared with the signals established by these G-3 and G-4 timing signals applied to the gates 108, 109, 111, 113, and 115. The coincidence for each of the four lines of the SIC address making up the cell is gated through by the associated P-3 until the counter 228 registers a count of 4, which count is established by setting the flip-flop 230. The flip-flop 234, if previously set, is reset by a P-3 signal during the G-4 time interval, and the P-1 signal in the following G-1 time interval gates through the condition of flip-flop 230 to set flip-flop 234. Immediately thereafter, G-1 occurs, and the P-2 signal resets the flip-flop 230 together with the counter 228. The set condition of the flip-flop 234 enables the gate 238 to pass successive P-2 pulses. Since flip-flop 234 remains set for a period of a full cell from G-1 to G-4, four P-2 pulses are passed by the gate 238. These outputs from the gate 238 are used as read-out pulses and shift pulses on SL in the console logic. Thus, when the four SIC lines of a drum cell coincide with the selected address from the console, four shift pulses are developed during each of the G-1 to G-4 times of the next cell. These shift pulses occur when the information-bin cell for that SIC address (see FIG. 4) has moved into position to be read out. Thus, the information stored in the shift console registers corresponds to the selected SIC address.

In FIG. 9 a shift register suitable for use in the console logic network of FIG. 2 is illustrated. The first stage of the shift register includes a flip-flop 240, the set and reset inputs of which receive signals from the I-1 and I-1' lines, respectively, via gates 242 and 244 and delay circuits 246 and 248, respectively. The delay elements 246 and 248 may be delay lines or one-shot multivibrator circuits or any other suitable temporary storage of the gate output signals during the time of shift line pulses, which pulses are used for driving the gates 242 and 244. The 1-output and 0-output of the flip-flop 240 are applied as inputs to the second stage 250 of the shift register.

The second stage 250 is constructed in the same way as the first stage, as are the third stage 252 and the fourth stage 254. The 1-outputs of the four shift register stages are connected in parallel to the coils of the relays 142, 144, 146, and 148.

In operation, either the 1-output or the 0-output of each flip-flop depending upon its being set or reset, supplies an enabling signal to the associated gate, which, in turn, causes the next flip-flop to be set or reset in the same way. Thus, the information is entered into the first stage and shifted serially along the shift register stages. The outputs of the shift register are continuously monitored by the coils of the relays directly connected in parallel to the associated shift register stages. The flip-flops may be transistor circuits in a bistable multivibrator configuration and connected for direct drive of the low-current sensitive single-leaf relays 142, 144, 146, 148, with a 6-volt direct voltage supply.

In FIG. 10 a logic arrangement is shown suitable for use in the commutator 48 of FIG. 1. This includes a three-stage binary counter 260, the first stage of which receives the reset signals from the reset track 44 of the drum, which signals occur once each revolution of the drum. Thus, the counter 260 counts eight revolutions of the drum before it recycles to zero. Each of the flip-flop stages 260 has two outputs that are applied to a plurality of gates 262 in combinatorial fashion so that each gate 262 receives a different set of the six outputs from the three counter stages. Thereby, each gate 262 represents a different one of the eight possible counts registered in the counter 260. The output of the gates 262 are the commutator lines C-1 to C-8 which are applied to the consoles for timing their operation. Accordingly, enabling signals are applied to the commutator lines C-1 to C-8 successively during successive revolutions of the drum.

The arrangement of the drum in a plurality of information bins or sections associated with each drum address or stock together with the ability of the operator to select any one bin for read out makes possible a relatively simple console construction. Each operator of a large group of operators can obtain, without any delay, significant single piece of information about a stock or the entire body of available information. The information is supplied from the bins successively as quickly as the operator actuates the switches which is the same order of time that is necessary for an operator to take proper note of the displayed information.

In FIG. 11, an additional feature of this system is illustrated; parts corresponding to those previously described are referenced by the same numerals. An additional bin 22' on the drum 10' is provided in order to store the closing prices of the stored stocks from the previous stock market day. This bin 22' is generally the same as the "Last" bin 22, and similarly associated parts are referenced by the same numerals with the addition of a prime ('). The "Last" selector line from the buffer 70 is connected to two fixed contacts of a double-pole double-throw switch 270, one pole 272 of which in its normal position, connects the "Last" line to the read out gates 76. A "Close" selector line connected to a selector switch (not shown) in the console, in a similar fashion as the others 120, is connected to two fixed contacts of the switch 270. A pole 274 normally connects the "Close" line to the read out gates 76'. Thereby, an operator can obtain the closing price information from the bin 22' on the drum in the same fashion as any other class of information is obtained.

The switch 270 may be manually operated, or it may be relay-operated as indicated by the coil 276. When the switch 270 is operated to its other position, the pole 274 connects the "Last" selector line to the gates 76' of the bin 22', and the pole 272 connects the "Close" line to the gates 76 of the bin 22. Consequently, an operator, by actuating switch 270 changes the significance of the data in the bins 22 and 22'. Thus, at the start of a market day the information in all of the bins except the "Last" bin of the previous day can be erased. The switch 270 is then reversed to convert the "Last" bin of the previous day to the "Close" bin of the new day.

The data processing and stock quotation system of this invention provides a simple and reliable system for providing stock quotation information to a large number of individual operators or brokers. The brokers can request the information in a convenient fashion while seated at their desk, and the requested information is immediately displayed. Several brokers can request information in the same or different bins at the same time. All or any part of the stored information is immediately obtainable.

I claim:
1. A stock information system which comprises
    (a) a cyclic memory having a cyclic stock identification section allocated to coded multi-character identifications of stocks and a plurality of separate cyclic sections allocated to a plurality of different categories of stock information,
    (b) allocations for said coded multi-character identifications of different stocks occurring successively in respective cells of said cyclic stock identification section with each cell including a predetermined plurality of successive bit intervals,
    (c) allocations for said different categories of information of a respective stock occurring simultaneously in cells of the respective cyclic sections which begin a predetermined number of bit intervals after the respective identification cell and include a predetermined plurality of successive bit intervals,
    (d) a plurality of request units each including means for producing requests having a said coded multi-character stock identification and a category section signal and means for receiving and displaying replies thereto,
    (e) coincidence means supplied with coded multi-character stock identification signals from a request unit and from said cyclic memory to determine coincidence therebetween,

(f) readout control means responsive to said coincidence for developing a readout signal during a predetermined interval following coincidence corresponding to the cell interval allocated to the categories of information on the respective stock in said cyclc memory, (g) and reply means responsive to said readout signal and to the category section signal in a request for supplying the corresponding category of information in said cyclic memory to the requesting unit for display thereat.

2. A system in accordance with claim 1 in which said coded multi-character identifications are coded alphabetic characters coresponding to the respective stocks.

3. A system in accordance with claim 1 in which said request units include means for storing their respective multi-character stock identification and category section requests until manually changed, and including means for enabling said plurality of request units repeatedly in a predetermined sequence for producing respective requests and receiving replies thereto.

4. A system in accordance with claim 1 in which two of said category cyclic sections are allocated to closing prices of a preceding day and last prices, respectively, and including category readout circuits for supplying closing or last prices in response to coresponding category section request signals, and switch means for interchanging said category readout circuits responding to corresponding category section request signals whereby the last price section of a preceding day becomes the closing price section for the succeeding day and vice versa.

5. A system in accordance with claim 1 in which said cyclic memory is a magnetic drum memory and said stock identification section and plurality of different category information sections comprise separate tracks on the drum.

6. A system in accordance with claim 5 in which the stock identification section includes a plurality of tracks and a predetermined plurality of bit positions in each track allocated to the storage of a said coded multi-character identification of a stock in series-parallel format, each category information section includes a plurality of tracks and a predetermined plurality of bit positions in each track allocated to the storage of a category of information concerning a stock in series-parallel format, and corresponding bit positions in the category sections allocated to a respective stock occur simultaneously and at least one bit position after the last bit position in the stock identification section allocated to the respective stock.

7. A system in accordance with claim 6 including means for supplying to said coincidence means the coded multi-character stock identification signal from a request unit in series-parallel conforming to the series-parallel format of the drum, said readout control means comprising means for producing a series of pulses occurring during respective bit positions of the category sections corresponding to the identified stock, said reply means comprising storage means for receiving information from a category section, and means for utilizing said series of pulses to supply information from a category section of the drum to said storage means.

8. A system in accordance with claim 6 in which each of said request units includes a plurality of manually-operated groups of switches, each group corresponding to a different alphabetic character position of a multi-character stock identification and settable to form a coded representation of different letters for the respective character position, and a plurality of manually-operated category switches for selecting different categories of information, said switches retaining their operated condtions until manually changed; means for utilizing said groups of switches to provide a multi-character stock identification signal to said coincidence means in series-parallel conforming to the series-parallel format of the drum, means for utilizing said category switches to obtain information from the corresponding category sections of the drum, and means for enabling said plurality of request units repeatedly in a predetermined sequence for producing respective requests and receiving replies thereto.

9. A system in accordance with claim 6 including a read head for each of said tracks and a separate amplifier for each read head for continuously reading signals in each track.

References Cited

UNITED STATES PATENTS

| | | | |
|---|---|---|---|
| 2,710,392 | 6/1955 | Jammer | 340—153 |
| 2,910,238 | 10/1959 | Miles et al. | 235—167 |
| 3,082,402 | 3/1963 | Scantlin | 340—152 |
| 3,133,268 | 5/1964 | Avakian et al. | 340—152 |
| 3,134,016 | 5/1964 | Connolly et al. | 235—152 |
| 3,159,818 | 12/1964 | Scantlin | 340—172.5 |

ROBERT C. BAILEY, *Primary Examiner.*

R. M. RICKERT, *Assistant Examiner.*